US012131488B2

(12) United States Patent
Wu et al.

(10) Patent No.: US 12,131,488 B2
(45) Date of Patent: Oct. 29, 2024

(54) ELECTRONIC APPARATUS AND METHOD USED FOR OBJECT TRACKING

(71) Applicant: Realtek Semiconductor Corp., HsinChu (TW)

(72) Inventors: Chih-Wei Wu, HsinChu (TW); Chien-Hao Chen, HsinChu (TW); Chao-Hsun Yang, HsinChu (TW); Shih-Tse Chen, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 358 days.

(21) Appl. No.: 17/686,379

(22) Filed: Mar. 3, 2022

(65) Prior Publication Data
US 2023/0154017 A1    May 18, 2023

(30) Foreign Application Priority Data
Nov. 17, 2021   (TW) .................................. 110142709

(51) Int. Cl.
*G06T 7/246*   (2017.01)

(52) U.S. Cl.
CPC .... *G06T 7/251* (2017.01); *G06T 2207/30196* (2013.01)

(58) Field of Classification Search
CPC ...................... G06T 7/251; G06T 2207/30196
See application file for complete search history.

(56) References Cited

U.S. PATENT DOCUMENTS

| | | | |
|---|---|---|---|
| 7,991,199 B2* | 8/2011 | Das ................... | G06F 18/24137 |
| | | | 382/118 |
| 10,789,454 B2* | 9/2020 | Shibata ............... | G06V 40/171 |
| 11,004,209 B2* | 5/2021 | Chen ..................... | G06V 10/82 |
| 11,024,039 B2* | 6/2021 | Danielsson .......... | G06V 40/103 |
| 11,106,903 B1* | 8/2021 | Huynh .................. | G06V 10/82 |
| 11,398,089 B1* | 7/2022 | Jindal ................... | G06V 10/82 |
| 11,443,232 B1* | 9/2022 | Rahman .............. | G06F 18/2148 |
| 11,537,882 B2* | 12/2022 | Kim ........................ | G06N 3/04 |
| 11,625,905 B2* | 4/2023 | Tokmakov ........... | G06V 10/469 |
| | | | 382/103 |

FOREIGN PATENT DOCUMENTS

TW    202207226 A    2/2022

OTHER PUBLICATIONS

Nicolai Wojke et al., "Simple Online and Realtime Tracking with a Deep Association Metric", arXiv.org, Cornell University ,Mar. 21, 2017.
Zhihui Zhu et al., "Viewpoint-Aware Loss with Angular Regularization for Person Re-Identification", arXiv.org, Cornell University ,Dec. 3, 2019.
Yu-Chiang Frank Wang, "Deep Learning for Computer Vision", National Taiwan University ,Oct. 20, 2020.

* cited by examiner

*Primary Examiner* — Gregory M Desire
(74) *Attorney, Agent, or Firm* — Winston Hsu (57) ABSTRACT

A method used for object tracking includes: using a specific object model to generate a first vector of a first ratio object and a second vector of a second ratio object of an image in an object detection bounding box of a specific frame; generating an identity label of an object within the bounding box according to the first vector, the second vector, and M first ratio reference vectors and M second ratio reference vectors stored in an object vector database.

18 Claims, 5 Drawing Sheets

ELECTRONIC APPARATUS AND METHOD USED FOR OBJECT TRACKING

BACKGROUND OF THE INVENTION

1. Field of the Invention

The present invention relates to image processing, and more particularly, to an electronic apparatus and a method used for object tracing.

2. Description of the Prior Art

In general, there are mainly two types of existing object tracking technologies. The first type of object tracking technology is one-stage object tracking, which uses deep learning to directly train and generate a model that can perform object detection and object tracking at the same time. The second type of object tracking technology is two-stage object tracking, which separates the object detection operation and the object tracking operation, and independently designs an object detector and an object tracker, respectively. The detection result by the object detector is input into the independently-designed object tracker for object tracking.

However, there are many problems in the practical object tracking operation, which will increase the difficulty of object comparison. Specifically, the occlusion phenomenon is the hardest problem to overcome. When the image cut by the existing object detector is sent to the existing tracker for interpretation, it will cause difficulty in identification because the object feature vector entering the existing tracker leaves only half of the original information and is error-prone. As for the occlusion phenomenon, the existing object tracking technologies cannot effectively solve the problem, such that the accuracy of marking the correct identity of the object is not high when tracking the object.

SUMMARY OF THE INVENTION

Therefore, in order to improve the determination problem caused by the occlusion phenomenon encountered during object tracking, one of the objectives of the present invention is to provide an electronic apparatus and a method that can simultaneously consider the characteristics of the whole and part of the object (such as the whole body and half of the body) and consider the correlation between multiple frames at the same time, and optimize all detection results, thereby improving the accuracy of object re-identification during object tracking as well as the recall rate.

At least one embodiment of the present invention provides a method used for object tracking. The method comprises: using a specific object model to generate a first vector of a first ratio object and a second vector of a second ratio object of an object detection bounding box corresponding to a specific frame; and generating an identity label of an object within the object detection bounding box according to the first vector, the second vector and M first ratio reference vectors and M second ratio reference vectors stored in an object vector database.

At least one embodiment of the present invention provides an electronic apparatus used for object tracking. The electronic apparatus comprises a storage circuit and a processing circuit. The storage circuit is configured to store a specific object model and an object vector database. The processing circuit is coupled to the storage circuit, and is configured to: use a specific object model to generate a first vector of a first ratio object and a second vector of a second ratio object of an object detection bounding box corresponding to a specific frame; and generate an identity label of an object within the object detection bounding box according to the first vector, the second vector and M first ratio reference vectors and M second ratio reference vectors stored in an object vector database.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
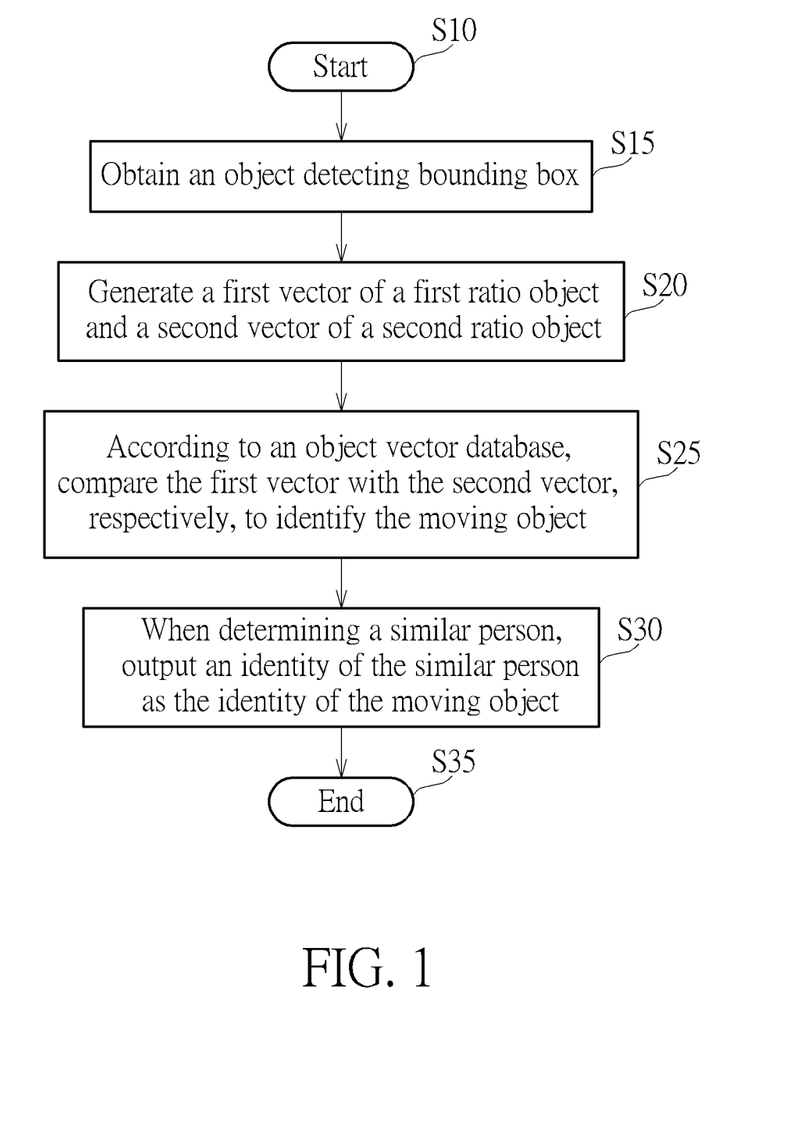
FIG. 1 is a brief flowchart of a method for tracking moving objects according to an embodiment of the present application.

The present invention aims to provide a technical solution, an electronic apparatus and a corresponding method for accurately performing operations of object identifying and tracking. Please refer to FIG. 1. FIG. 1 is a brief flowchart of a method for tracking moving objects according to an embodiment of the present application. If roughly the same result can be achieved, the steps in the flow shown in FIG. 1 does not have to be performed in sequence, and the steps shown in FIG. 1 do not have to be performed continuously, that is, other steps can also be inserted in the flow. The steps in the flow are described in detail below:

Step S10: Start;

Step S15: Input or obtain an object detecting bounding box on a specific frame;

Step S20: According to the object detection bounding box, use a specific object detection model to generate and obtain a first vector of a first ratio object and a second vector of a second ratio object. The first and second ratio objects respectively refer to a first ratio and a second ratio of a specific moving object in the object detection frame. For example, the first ratio of the moving object is an overall ratio, the first vector is an overall ratio vector of the object, the second ratio of the moving object is a partial ratio, and the second vector is a partial ratio vector of the object. For example, when the specific object detection model is a person object detection model and the moving object is a person, the first ratio of the person is a whole body ratio, and the second ratio of the person is a half body ratio, where the half body ratio can be the ratio of the upper body or the ratio of the lower body, and the first vector of the person is a whole body ratio vector of the person, and the second vector of the person is a half body ratio vector of the person. However, the present invention is not limited thereto. In addition, the partial ratio can be, but not limited to, 1/3 or 1/4;

Step S25: According to an object vector database (such as a person vector database), compare the first vector with the second vector to identify the moving object, where the person vector database stores, for example, the reference vector of the whole body ratio and the reference vector of the half body ratio of a plurality of different reference persons, respectively. By comparing the whole body vector and the half body vector, determine which person's whole body image or half body image that the image of the moving object corresponds to or is similar to;

Step S30: When determining a similar person, output an identity of the similar person as the identity of the moving object, and give the object detection bounding box a corresponding identity label (or an object serial number) to complete the identity labeling, and add the image/vector within the object detection bounding box to the object vector database as the image or vector of the similar person; and Step S35: End.

Figure 2:
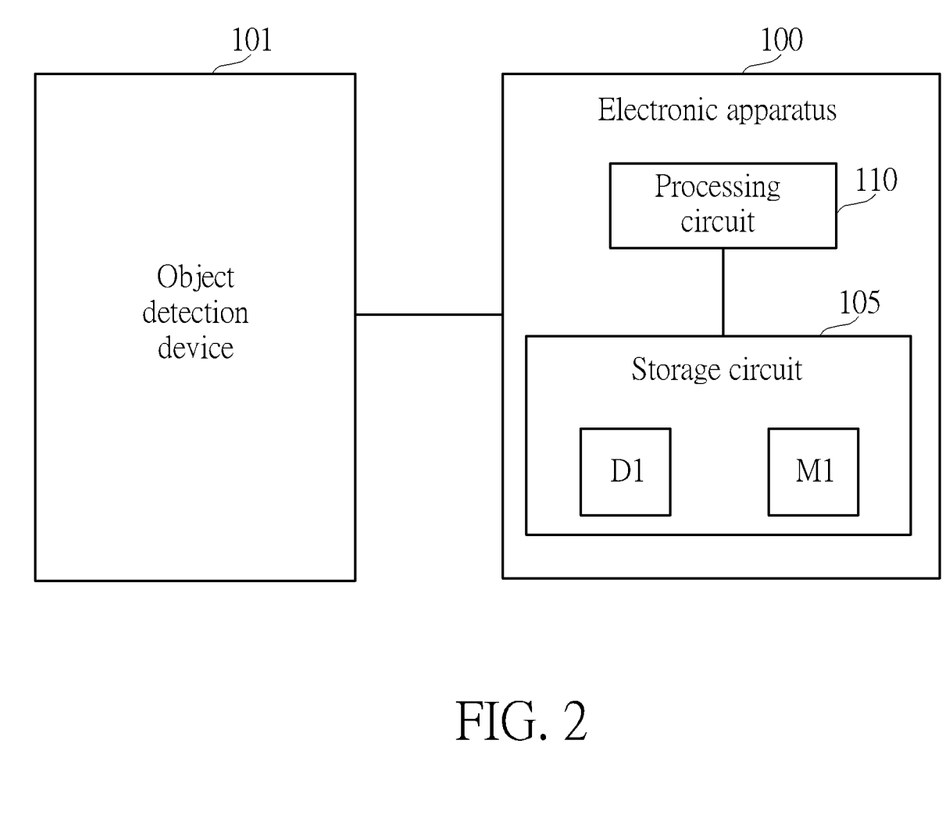
FIG. 2 is a block diagram of an electronic apparatus/circuit for object tracking according to an embodiment of the present application.

Regarding practical implementation, please refer to FIG. 2. FIG. 2 is a block diagram of an electronic apparatus/circuit 100 for object tracking according to an embodiment of the present application. The electronic apparatus 100 is externally coupled to an object detection device/circuit 101, and comprises a storage circuit 105 and a processing circuit 110. The storage circuit 105 is configured to store the above-mentioned specific object model M1 (e.g., a person object model) and the object vector database D1 (e.g., a reference person vector database).

The processing circuit 110 is coupled to the storage circuit 105. The electronic apparatus 100 receives an input object bounding box from the object detection device 101. The object detection device 101 is configured to detect images of one or more frames, for example, to detect a moving object in a specific frame, and to identify the image of the moving object that is bounded by a shape of a specific range (e.g., a quadrilateral such as a rectangular box is used to enclose the moving object, where the generated rectangular box is the above-mentioned object detection bounding box). For an image of a frame, since there may be one or more moving objects, the object detection device 101 can generate and output one or more different object detection bounding boxes to the electronic apparatus 100. After receiving the one or more object detection bounding boxes and the images therein, the electronic apparatus 100 gives each object detection bounding box a corresponding identity label as the identity of the corresponding moving object. For the case where the same moving object is in multiple object detection bounding boxes of different frames, the electronic apparatus 100 assigns the same identity label or object serial number to the object bounding boxes. For multiple object detection bounding boxes of different moving objects, the electronic apparatus 100 assigns different and unique identity labels or object serial numbers to the object detection bounding boxes. In addition, the identity label can also be regarded as a serial number of an object, which is used to track the moving object in different frames in real time.

A moving object including, but not limited to, a person object (which can be other types of moving object, such as a machine, a vehicle or an animal) may be partially occluded by some objects. In order to achieve the effect of effectively tracking the moving object even if a certain part of the moving object is occluded by other moving or still objects, taking an object detection bounding box of a specific frame and the moving object being a person object as an example, each reference person in the reference person vector database D1 stored in the storage circuit 105 has a first vector of a first ratio object (e.g., a whole body ratio object image), a second vector of a second ratio object (e.g., a half body ratio object image) and/or one or more vectors corresponding to object images of different viewing angles/rotation angles. For example, the reference person vector database stores M persons, and a person may have a whole body ratio reference vector as the first vector, a half body ratio reference vector as the second vector and/or one or more reference vectors of different rotation angles (corresponding to different turned/rotated images of the person). In addition, the number of M is not limited, and can be updated and increased by the processing circuit 110. The detailed steps of the operation will be described later.

In one embodiment, taking the whole body ratio vector and the half body ratio vector of the person as an example for illustration (but not limited to), the reference person vector database D1 records M whole body ratio reference vectors and M half body ratio reference vectors of M different persons. When the processing circuit 110 receives an input image of an object detection bounding box of a specific frame (corresponding to an input person), the processing circuit 110 performs vector calculation according to a person detection model and the image of the object detection bounding box, to generate a whole body ratio detection vector and a half body ratio detection vector of the input person. For example, the processing circuit 110 converts at least a part of the image of the input person into the whole body ratio detection vector and the half body ratio detection vector. In addition, the implementation of the person detection model may use one of a person feature point model, a person distance difference model, a person re-identification model, etc., but the present invention is not limited thereto.

Then, the processing circuit 110 performs the comparison of the whole body ratio vector and the comparison of the half body ratio vector, respectively. The processing circuit 110 compares the whole body ratio detection vector with M whole body ratio reference vectors of M different reference persons in the specific person model. For example, a vector distance calculation is performed on the whole body ratio detection vector and the M whole body ratio reference vectors, respectively, to generate M whole body ratio vector distance values corresponding to the M different reference persons, respectively. Similarly, the processing circuit 110 compares the half body ratio detection vector with M half body ratio reference vectors of M different reference persons in the specific person model. For example, a vector distance calculation is performed on the half body ratio detection vector and the M half body ratio reference vectors, respectively, to generate M half body ratio vector distance values corresponding to the M different reference persons, respectively. The above-mentioned calculation of the vector distance may be implemented by calculating a Euclidean distance (L2 distance), but the present invention is not limited thereto. In one embodiment, the processing circuit 110 selects a minimum whole body ratio vector distance value from the M whole body ratio vector distance values, and a reference person corresponding to the minimum whole body ratio vector distance value, and selects a minimum half body ratio vector distance value from the M half body ratio vector distance values, and a reference person corresponding to the minimum half body ratio vector distance value, where the reference persons corresponding to the two minimum vector distance values may be the same or may be different.

The processing circuit 110 compares the minimum whole body ratio vector distance value with a threshold Tmatch. When the minimum whole body ratio vector distance value is smaller than the threshold Tmatch, the processing circuit 110 can determine that, with respect to the whole body ratio image, the input person is similar to a whole body image of a reference person corresponding to the minimum whole body ratio vector distance value. Therefore, it can be determined that the identity of the input person is the same as the identity of the reference person corresponding to the minimum whole body ratio vector distance value, such that the identity label of the input object detection bounding box can be labeled as the identity of the reference person corresponding to the minimum whole body ratio vector distance value, and a whole body image of the input person or the whole body ratio detection vector thereof can be simultaneously or synchronously updated by the whole body ratio reference image or the whole body ratio reference vector corresponding to the minimum whole body ratio vector distance value, so as to implement the real-time tracking of the whole body image of the person.

When the minimum whole body ratio vector distance value is greater than or equal to the threshold Tmatch, the processing circuit 110 can determine that, with respect to the whole body ratio image, the input person is not similar to the whole body image of the reference person corresponding to the minimum whole body ratio vector distance value. Therefore, the determination of the half body ratio is then performed to determine whether the current image of the input person is similar to the resultant image of a certain reference person who is partially occluded. At this time, the processing circuit 110 compares the minimum half body ratio vector distance value with another threshold Tmu. When the minimum half body ratio vector distance value is smaller than the threshold Tmu, the processing circuit 110 can determine that, with respect to the half body ratio image, the input person is similar to a half body image of a reference person corresponding to the minimum half body ratio vector distance value. Therefore, it can be determined that the identity of the input person is the same as the identity of the reference person corresponding to the minimum half body ratio vector distance value, such that the identity label of the input object detection bounding box can be labeled as the identity of the reference person corresponding to the minimum half body ratio vector distance value, and a half body image of the input person or the half body ratio detection vector thereof can be simultaneously or synchronously updated by the half body ratio reference image or the half body ratio reference vector corresponding to the minimum half body ratio vector distance value, so as to implement the real-time tracking of the half body image of the person.

In addition, in another embodiment, when determining a whole body ratio image or a half body ratio image, an Intersection-over-Union (IoU) calculation can be used to assist in the determination. The following takes determination of a whole body image as an example. For example, in one embodiment, the processing circuit 110 can also generate the ratio of a person part of the input person to the whole input person according to the person detection model, such as the ratio of the half body of the input person, and the processing circuit 110 can be used to generate a speed prediction bounding box corresponding to the object detection bounding box in the specific frame. Specifically, the processing circuit 110, for example, calculates the speed according to a plurality of object detection bounding boxes corresponding to one or more identical persons in multiple previous frames, to generate one or more speed prediction bounding boxes. Taking a speed prediction bounding box as an example for illustration, the processing circuit 110 can calculate an IoU distance between the current object detection bounding box and the speed prediction bounding box in the specific frame according to the above-mentioned half body ratio of the input person, the whole body ratio detection vector of the input person and the reference person vector database. When the value of the IoU distance is getting larger, it represents that the current object detection bounding box is close to the speed prediction bounding box. On the contrary, when the value of the IoU distance is getting smaller, it represents that the current object detection bounding box is farther away from the speed prediction bounding box. In addition, with respect to the whole body ratio vector (also true with respect to the half body ratio vector), when the above-mentioned minimum whole body ratio vector distance value is getting smaller, it represents that the person is closer to a reference person corresponding to the minimum whole body ratio vector distance value in the reference person database. Therefore, in the present embodiment, the processing circuit 110 generates M adjusted whole body ratio vector distance values according to a specific weight value, the IoU distance and each of the M whole body ratio vector distance values, wherein each adjusted whole body ratio can be expressed by the following formula:

$$dm'=(1-d\_iou)\times\alpha+dm\times(1-\alpha)$$

where dm' is an adjusted whole body ratio vector distance value, d_iou is the IoU distance, $\alpha$ is the specific weight value which can be adjusted by the user, and dm is the distance value of each whole body ratio vector. In the present embodiment, when a minimum adjusted whole body ratio vector distance value among the M adjusted whole body ratio vector distance values is smaller than the specific threshold Tmatch, the processing circuit 110 can determine that the input person is similar to or close to a reference person corresponding to the minimum adjusted whole body ratio vector distance value, and labels the identity of the input person as the identity the reference person. Specifically, the label of the person detection bounding box is labeled as the identity of the reference person.

In addition, in one embodiment, after the processing circuit 110 assigns a new identity label to an input person, the processing circuit 110 does not immediately update the input person to the reference person vector database. Specifically, the processing circuit 110 is used to update the input person to the reference person vector database after detecting that the input person with the same identity label appears in N consecutive frames, so as to prevent misjudgment; where N is, for example, equal to 3, but is not limited to.

In practice, the storage circuit 105 is also used to store a temporary object vector database, such as a temporary person vector database, which is used to store the whole body ratio reference vector(s) and the half body ratio reference vector(s) of person(s) currently or continuously appearing in at least one frame. For example, when the processing circuit 110 determines that the minimum adjusted whole body ratio vector distance value is not smaller than the specific threshold Tmatch and the minimum half body ratio vector distance value is not smaller than the threshold Tmu, the processing circuit 110 can perform comparison that is based on the temporary person vector database. For example, the temporary person vector database currently stores the whole body ratio reference vectors and the number of consecutive appearance of K different temporary persons.

The processing circuit 110 calculates a vector distance value between the whole body ratio reference vectors of K different temporary persons and the whole body ratio detection vector of the input person respectively, finds a minimum vector distance value and the corresponding temporary person from the K vector distance values, and determines whether the minimum vector distance value is smaller than a temporary threshold Ttep. If the minimum vector distance value is smaller than the temporary threshold Ttep, the processing circuit 110 adds 1 to the corresponding number of consecutive appearance, and then determines whether the updated number of consecutive appearance is greater than or equal to N (the value of N is, for example, 3, but is not limited to). If the updated number of consecutive appearance is greater than or equal to N, the processing circuit 110 can determine that the corresponding temporary person has appeared in N frames continuously, and then the temporary person and its corresponding whole body ratio reference vector are added and updated to the reference person vector database. That is, in this status, it is determined that the temporary person has been confirmed as a reference person object, and the identity label or object serial number corresponding to the temporary person is also updated to the reference person vector database.

If it is determined that the minimum vector distance value is not smaller than a temporary threshold Ttep, it represents that the input person corresponding to the minimum vector distance value does not exist in the temporary person vector database and also does not exist in the reference person vector database at the same time. In this status, the processing circuit 110 can add and update the input person to the temporary person vector database, and give the input person a different and unique identity label or object serial number to indicate that the input person is a new and different person. If it is determined that the minimum vector distance value is smaller than the temporary threshold Ttep, and the updated number of consecutive appearance is smaller than N, it represents that the input person is similar to a certain temporary person in the temporary person vector database, that is, the input person may already exist in the temporary person vector database. However, since the number of consecutive appearance has not exceeded N, the processing circuit 110 does not update the information of a certain temporary person to the person vector database at this time. As a result, by performing the steps, it is possible to prevent updating the reference person vector database too frequently and to further prevent misjudgment.

In addition, in one embodiment, if there are more than two vector distance values (or more than two adjusted whole body ratio vector distance values) that are all smaller than the specific threshold Tmatch, the processing circuit 110 can use a specific optimization algorithm (such as the Hungarian algorithm, but not limited to) to calculate multiple person object combinations with different loss values to find a person object combination with a minimum loss, and check the matching result of each individual person object combination among all the person object combinations. For example, if the vector distance value corresponding to the person object combination with the minimum loss is greater than or equal to the threshold TDLOSS, the processing circuit 110 can determine that the input person has an unknown identity (that is, the identity does not exist in the reference person vector database), and assign a new and different identity label or object serial number to the input person.

If the vector distance value corresponding to the person object combination with the minimum loss is smaller than the threshold TDLOSS, the processing circuit 110 can determine whether the value of the half body ratio of the image corresponding to the person object combination with the minimum loss is smaller than a specific threshold Th. If the value of the half body ratio is smaller than the threshold Th, the processing circuit 110 can update the half body ratio vector corresponding to the vector distance value of the person object combination with the minimum loss to the half body ratio vector of a certain reference person corresponding the vector distance value of the person object combination with the minimum loss in the person vector database, for taking the place of the half body ratio vector of the certain reference person.

Figure 3:
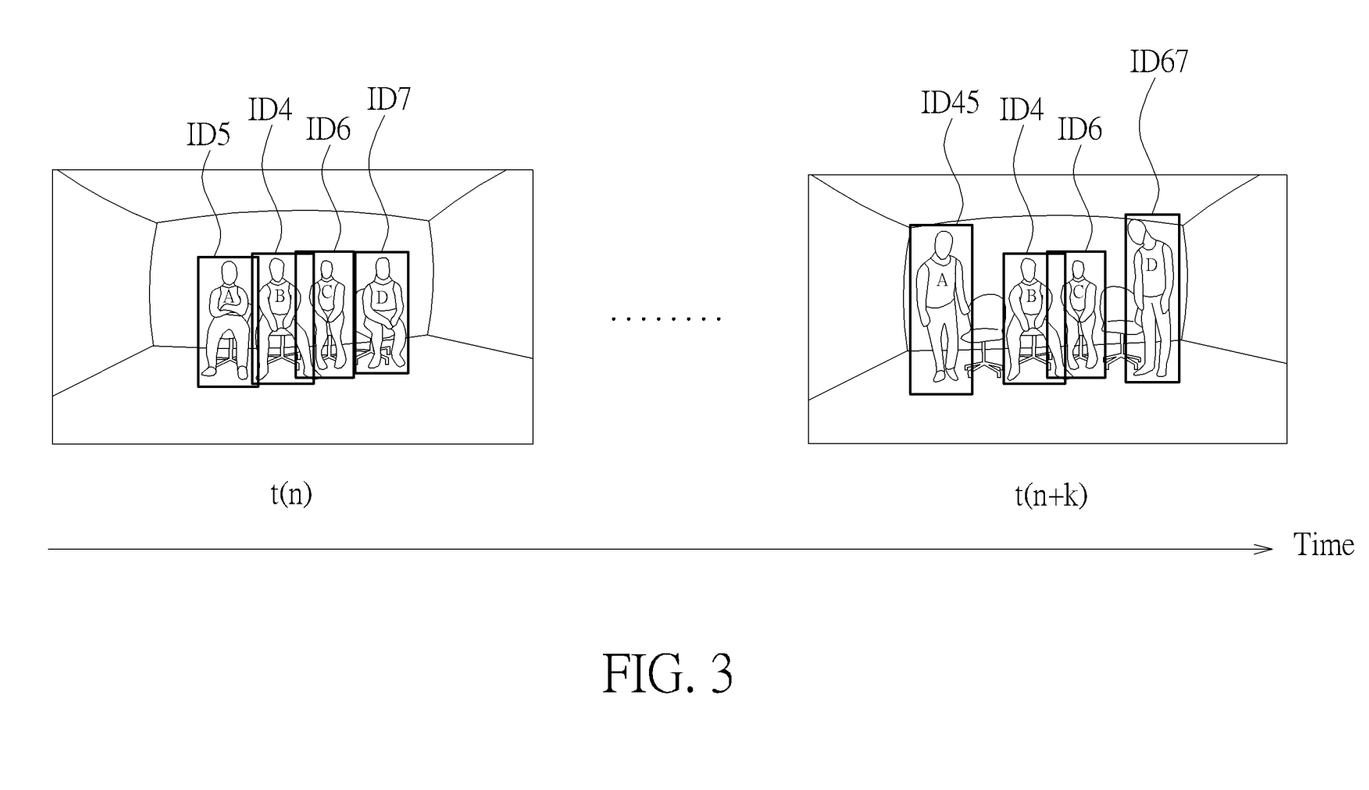
FIG. 3 is a diagram of an identity label result of object tracking in the prior art.
Figure 4:
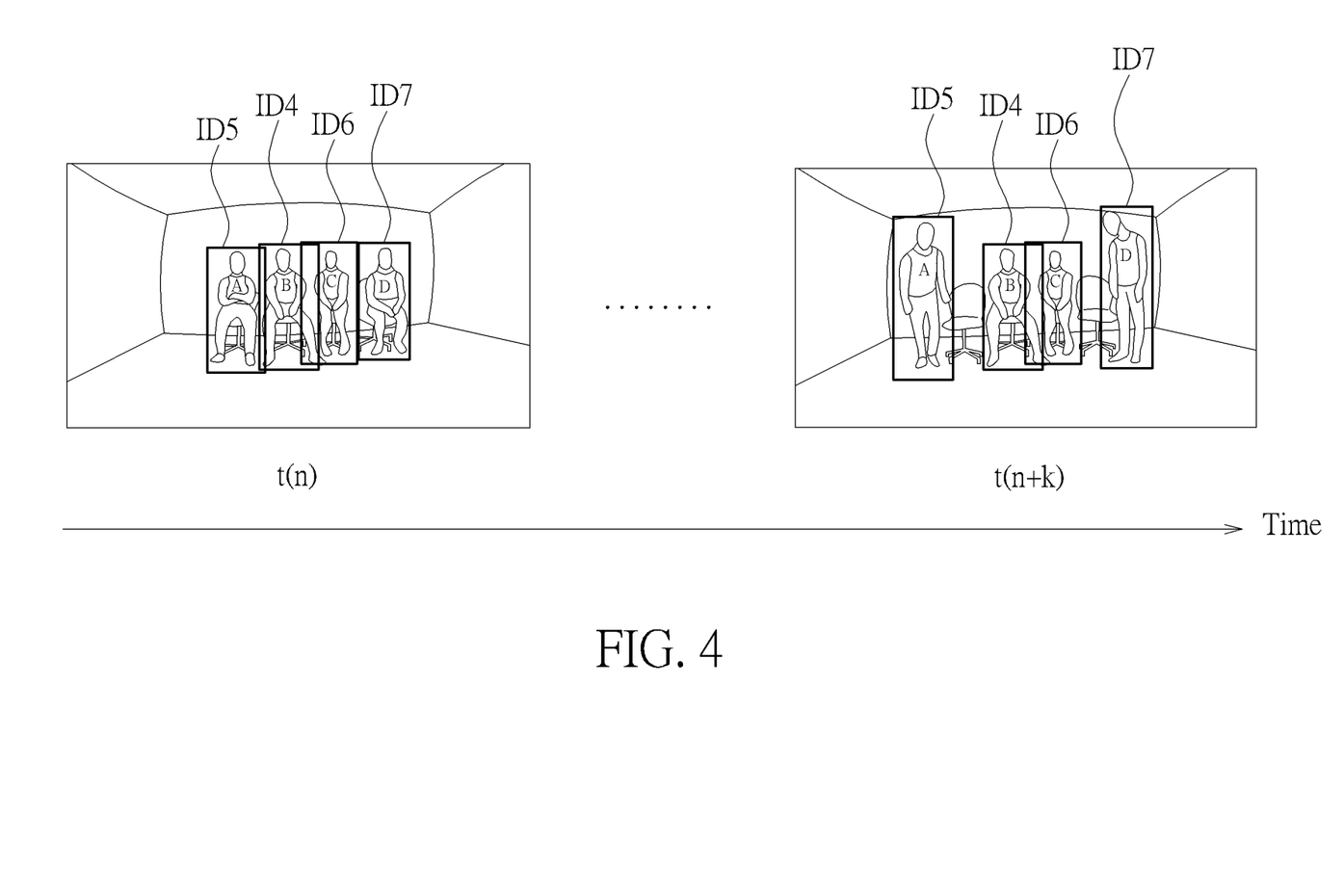
FIG. 4 is a diagram of an example of the identity label result of object tracking according to an embodiment of the present invention.

For better comprehension, FIG. 3 and FIG. 4 respectively provide a comparison between the identification results of object tracking in the prior art and the identification results of object tracking according to the embodiment of the present invention. As shown in FIG. 3, the processing time is from left to right. the object tracking technology in the prior art labels 4 object detection bounding boxes of 4 different persons in the left frame as ID5, ID4, ID6 and ID7 respectively at a time point t(n), wherein the real images of the persons in the 4 object detection bounding boxes all show sitting posture. As time goes by, in a subsequent frame such as the frame at a time point t(n+k), the real images of two of these persons still show sitting posture, while the real images of the other two persons show standing posture. As shown in the frame on the right side of FIG. 3, although the object tracking technology in the prior art can still correctly label the identify labels ID4 and ID6 in the detection bounding box of the two persons who keep the sitting posture. However, the object tracking technology in the prior art cannot overcome the problem of different view angels, different posture or occlusion phenomenon of the persons, such that even though the other two persons only change posture from sitting to standing and are not changed to entirely different persons, the object tracking technology in the prior art marks the detection bounding boxes corresponding to the two persons by different identity labels ID45 (which is different from ID5) and ID67 (which is different from ID7), respectively.

For the effect of the embodiment of the present invention, as shown in FIG. 4, the processing time is from left to right. In the present embodiment, the object tracking technology labels the 4 object detection bounding boxes of 4 different persons in the left frame as ID5, ID4, ID6 and ID7 respectively at a time point t(n), wherein the real images of the persons in the 4 object detection bounding boxes all show sitting posture. As time goes by, in a subsequent frame such as the frame at a time point t(n+k), the real images of two of these persons still show sitting posture, while the real images of the other two persons show standing posture. As shown in the frame on the right side of FIG. 4, the object tracking technology in the present embodiment can still correctly label the identify labels ID5 and ID7 in the detection bounding boxes of the two persons who change their posture. The two persons will not be erroneously determined as completely different persons due to different view angles, different posture or occlusion phenomenon of the persons. Therefore, compared with the prior art shown in FIG. 3, the embodiment of the present invention can improve the accuracy of real-time tracking of moving objects (e.g., persons), and improve the effect of the monitoring system.

Figure 5:
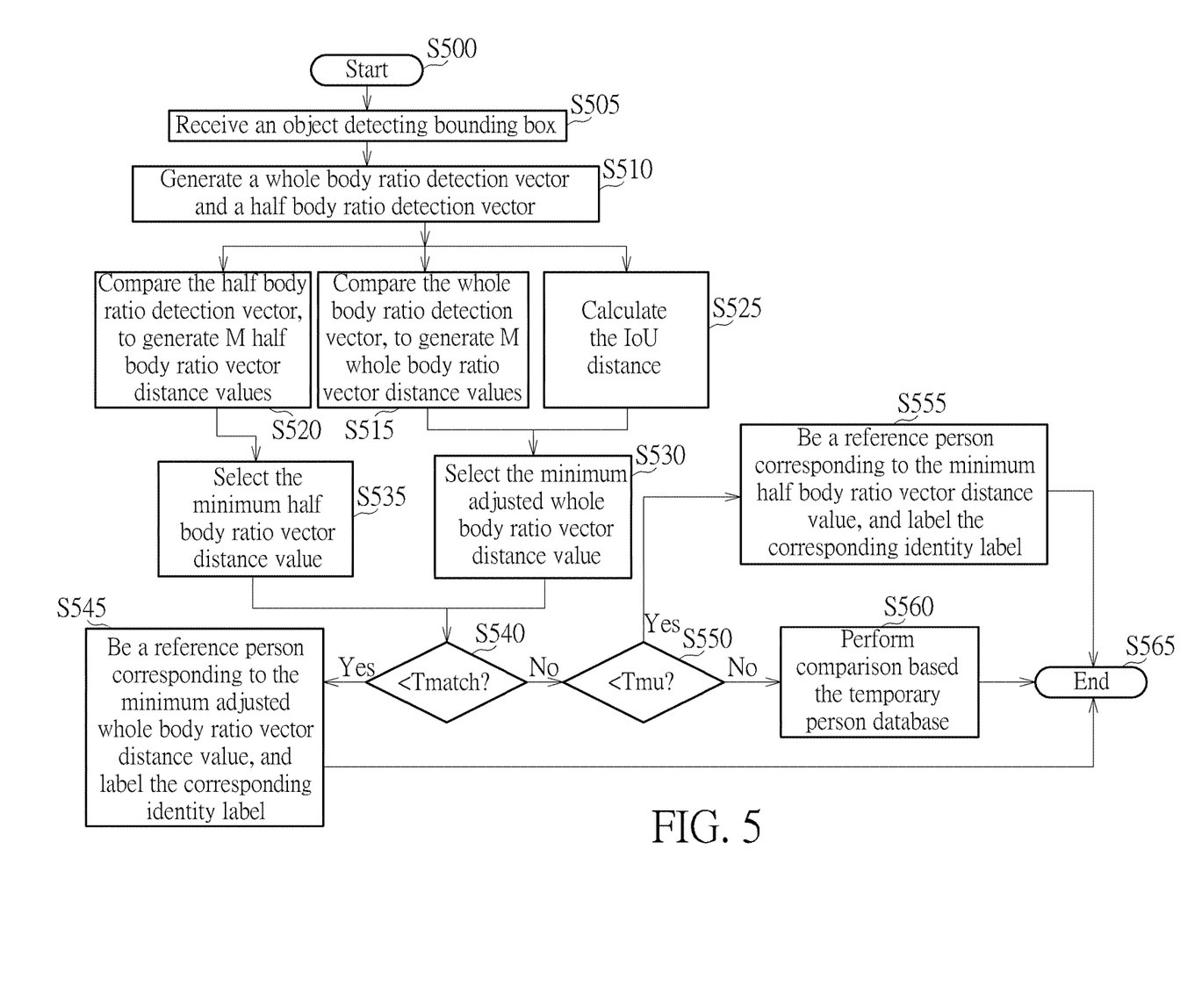
FIG. 5 is a flow chart of an operation of the electronic apparatus/circuit for object tracking shown in FIG. 2 according to an embodiment of the present invention.

In addition, for better comprehension about the principles and operation sequence of the detailed embodiments of the present invention, the flow chart of FIG. 5 is provided as an additional illustration. FIG. 5 is a flow chart of an operation of the electronic apparatus/circuit for object tracking shown in FIG. 2 according to an embodiment of the present invention. If roughly the same result can be achieved, the steps in the flow shown in FIG. 5 does not have to be performed in sequence, and the steps shown in FIG. 5 do not have to be performed continuously, that is, other steps can also be inserted in the flow. The steps in the flow are described in detail below:

Step S500: Start;

Step S505: Receive an input object detecting bounding box;

Step S510: Perform vector calculation according to an image of the input object detection bounding box and a specific person detection model, to generate a whole body ratio detection vector and a half body ratio detection vector of an input person;

Step S515: Compare the whole body ratio detection vector with M whole body ratio reference vectors of M different reference persons in the specific person detection model, and calculate the vector distance between the whole body ratio detection vector and the M whole body ratio reference vectors to generate M whole body ratio vector distance values;

Step S520: Compare the half body ratio detection vector with M half body ratio reference vectors of M different reference persons in the specific person detection model, and calculate the vector distance between the half body ratio detection vector and the M whole body ratio reference vectors to generate M half body ratio vector distance values;

Step S525: Calculate the IoU distance between the current input object detection bounding box and the speed prediction bounding box;

Step S530: Generate M adjusted whole body ratio vector distance values according to the IoU distance and the M whole body ratio vector distance values, and select the minimum adjusted whole body ratio vector distance value and the corresponding reference person;

Step S535: Select the minimum half body ratio vector distance value from the M half body ratio vector distance values, and select the corresponding reference person;

Step S540: Determine whether the minimum adjusted whole body ratio vector distance value is smaller than the threshold Tmatch. If the value is smaller than the threshold Tmatch, the step S545 is entered, and if the value is greater than or equal to the threshold Tmatch, the step S550 is entered;

Step S545: Determine that the input person is not an unknown person, but a reference person corresponding to the minimum adjusted whole body ratio vector distance value, and label the image corresponding to the input person with the identity label of the corresponding reference person as the identity label of the input person;

Step S550: Determine whether the minimum half body ratio vector distance value is smaller than the threshold Tmu. If the value is smaller than the threshold Tmu, the step S555 is entered, and if the value is greater than or equal to the threshold Tmu, the step S560 is entered;

Step S555: Determine that the input person is not an unknown person, but a reference person corresponding to the minimum half body ratio vector distance value, and label the image corresponding to the input person with the identity label of the corresponding reference person as the identity label of the input person;

Step S560: Determine that the input person does not exist in the reference person vector data, and perform comparison that is based the temporary person database; and Step S565: End.

In conclusion, through the object tracking method of the present invention, even if the object is largely occluded, the correct identity of the object can be successfully identified or re-identified, and the correlation between the video frame images can be considered at the same time, such that the performance and stability may be greatly improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method used for object tracking, comprising:
using a specific object model to generate a first vector of a first ratio object and a second vector of a second ratio object of an object detection bounding box corresponding to a specific frame; and
generating an identity label of an object within the object detection bounding box according to the first vector, the second vector and M first ratio reference vectors and M second ratio reference vectors stored in an object vector database;
wherein the step of generating the identity label of the object within the object detection bounding box further comprises:
determining an Intersection-over-Union (IoU) distance according to the object detection bounding box and a speed prediction frame of the specific frame; and
generating the identity label of the object within the object detection bounding box according to the first vector, the second vector, the IoU distance, the M first ratio reference vectors and the M second ratio reference vectors.

2. The method of claim 1, wherein the first ratio object corresponds to at least one first portion of the object, the second ratio object corresponds to at least one second portion of the object, and the least one first portion comprises the at least one second portion.

3. The method of claim 1, wherein the first vector of the first ratio object is a whole body object vector of the object, and the second vector of the second ratio object is a half body object vector of the object.

4. The method of claim 1, wherein the object is an input specific person, the object vector database is a person vector database, and the M reference vectors correspond to M different persons, respectively.

5. The method of claim 1, further comprising:
calculating M first vector distances according to the first vector and the M first ratio reference vectors;
generating M first adjusted vector distances by respectively weighting the M first vector distances with the IoU distance according to a specific weight value, and selecting a specific first adjusted vector distance from the M first adjusted vector distances;
calculating M second vector distances according to the second vector and the M second ratio reference vectors, and selecting a specific second adjusted vector distance from the M second vector distances; and determining the identity label of the object within the object detection bounding box according to the specific first adjusted vector distance and the specific second adjusted vector distance.

6. The method of claim 5, wherein the specific first adjusted vector distance is a minimum first adjusted vector distances among the M first adjusted vector distances, and the specific second adjusted vector distance is a minimum second adjusted vector distances among the M second adjusted vector distances.

7. The method of claim 6, further comprising:
when the minimum first adjusted vector distance is greater than a first threshold and the minimum second adjusted vector distance is smaller than a second threshold, using an identity label of a specific object in the object vector database corresponding to the minimum first adjusted vector distance as the identity label of the object in the object detection bounding box.

8. The method of claim 7, further comprising:
when the minimum first adjusted vector distance is greater than the first threshold and the minimum second adjusted vector distance is greater than the second threshold:
calculating K third vector distances according to the first vector and K first ratio reference vectors stored in a temporary vector database, and selecting a specific third vector distance from the K third vector distances; and
determining whether the calculated and selected specific third vector distance is smaller than a third threshold to further determine whether a temporary object in the temporary vector database corresponding to the specific third vector distance is similar to the object within the object detection bounding box.

9. The method of claim 8, further comprising:
when at least N consecutive specific third vector distances are all smaller than the third threshold, determining that the temporary object in the temporary vector database corresponding to the consecutive N specific third vector distances is similar to the object within the object detection bounding box, giving a specific identity label to the temporary object, and storing the temporary object and the specific identity label in the object vector database; and
when not all of N consecutive specific third vector distances are smaller than the third threshold, giving the specific identity label to a specific object corresponding to a latest specific third vector distance, and storing the specific object and the specific identity label in the temporary vector database but not the object vector database.

10. An electronic apparatus used for object tracking, comprising:
a storage circuit, configured to store a specific object model and an object vector database; and
a processing circuit, coupled to the storage circuit, configured to:
use a specific object model to generate a first vector of a first ratio object and a second vector of a second ratio object of an object detection bounding box corresponding to a specific frame; and
generate an identity label of an object within the object detection bounding box according to the first vector, the second vector and M first ratio reference vectors and M second ratio reference vectors stored in an object vector database;

wherein the processing circuit is further configured to:
determine an Intersection-over-Union (IoU) distance according to the object detection bounding box and a speed prediction frame of the specific frame; and
generate the identity label of the object within the object detection bounding box according to the first vector, the second vector, the IoU distance, the M first ratio reference vectors and the M second ratio reference vectors.

11. The electronic apparatus of claim 10, wherein the first ratio object corresponds to at least one first portion of the object, the second ratio object corresponds to at least one second portion of the object, and the least one first portion comprises the at least one second portion.

12. The electronic apparatus of claim 10, wherein the first vector of the first ratio object is a full body object vector of the object, and the second vector of the second ratio object is a half body object vector of the object.

13. The electronic apparatus of claim 10, wherein the object is an input specific person, the object vector database is a person vector database, and the M reference vectors correspond to M different persons, respectively.

14. The electronic apparatus of claim 10, wherein the processing circuit is configured to:
calculate M first vector distances according to the first vector and the M first ratio reference vectors;
generate M first adjusted vector distances by respectively weighting the M first vector distances with the IoU distance according to a specific weight value, and select a specific first adjusted vector distance from the M first adjusted vector distances;
calculate M second vector distances according to the second vector and the M second ratio reference vectors, and select a specific second adjusted vector distance from the M second vector distances; and
determine the identity label of the object within the object detection bounding box according to the specific first adjusted vector distance and the specific second adjusted vector distance.

15. The electronic apparatus of claim 14, wherein the specific first adjusted vector distance is a minimum first adjusted vector distances among the M first adjusted vector distances, and the specific second adjusted vector distance is a minimum second adjusted vector distances among the M second adjusted vector distances.

16. The electronic apparatus of claim 15, wherein the processing circuit is configured to:
when the minimum first adjusted vector distance is greater than a first threshold and the minimum second adjusted vector distance is smaller than a second threshold, use an identity label of a specific object in the object vector database corresponding to the minimum first adjusted vector distance as the identity label of the object in the object detection bounding box.

17. The electronic apparatus of claim 16, wherein the processing circuit is configured to:
when the minimum first adjusted vector distance is greater than the first threshold and the minimum second adjusted vector distance is greater than the second threshold:
calculate K third vector distances according to the first vector and K first ratio reference vectors stored in a temporary vector database, and select a specific third vector distance from the K third vector distances; and
determine whether the calculated and selected specific third vector distance is smaller than a third threshold to further determine whether a temporary object in the temporary vector database corresponding to the specific third vector distance is similar to the object within the object detection bounding box.

18. The electronic apparatus of claim 17, wherein the processing circuit is configured to:

when at least N consecutive specific third vector distances are all smaller than the third threshold, determine that the temporary object in the temporary vector database corresponding to the consecutive N specific third vector distances is similar to the object within the object detection bounding box, give a specific identity label to the temporary object, and store the temporary object and the specific identity label in the object vector database; and when not all of N consecutive specific third vector distances are smaller than the third threshold, give the specific identity label to a specific object corresponding to a latest specific third vector distance, and store the specific object and the specific identity label in the temporary vector database but not the object vector database.

* * * * *